Patented Mar. 13, 1934

1,950,442

UNITED STATES PATENT OFFICE 1,950,442

PREPARATION OF POLYMERS

Ira Williams, Woodstown, N. J., and Herbert W. Walker, Wilmington, Del., assignors to E. I. du Pont de Nemours & Company, Wilmington, Del., a corporation of Delaware No Drawing. Application July 28, 1933,
Serial No. 682,626

11 Claims. (Cl. 260—2)

This invention relates to the preparation of polymeric forms of an addition product of monovinylacetylene and hydrochloric acid. More particularly, it relates to an improvement in the process of polymerizing chloro-2-butadiene-1,3 and involves carrying out the polymerization under conditions adapted to increase the yield of those polymers having the desired characteristics and at the same time adapted to accelerate the rate of polymerization.

The addition product treated according to the present process and the preparation of the same is fully disclosed in an application of Carothers and Collins, Serial No. 490,538, filed October 22, 1930, and has the formula $CH_2=CCl-CH=CH_2$. The combination of monovinylacetylene with hydrogen chloride to form this product may be readily effected under a great variety of conditions.

It has been disclosed by Carothers and Collins in their application, Serial No. 519,243, filed February 28, 1931 that by polymerizing chloro-2-butadiene-1,3 it is possible to obtain products having various degrees of solubility, plasticity, elasticity and strength. These polymer products have been obtained not only in the form of rubber-like masses but also in the form of volatile liquids, viscous soft sticky masses and hard very tough granular masses. As clearly appears from that case, the nature of the product depends primarily upon the conditions under which polymerization is effected and the duration of the operation. Temperature, pressure, light and catalysts, such as oxygen and the peroxides, all affect the nature of the final product.

Carothers, Collins and Kirby, in their application Serial No. 519,242, filed February 28, 1931, have disclosed that the polymerization may be controlled if carried out in the presence of solvents.

The polymerization of chloro-2-butadiene-1,3, however, even when solvents are present, is extremely sensitive to small variations in prevailing conditions and it is difficult to control the polymerization to uniformly obtain a polymer of the desired characteristics. Especially is this true if the polymerization is carried out at temperatures above ordinary room temperature, as is desirable in order to accelerate the rate of reaction.

An object of the present invention is to perfect the method for effecting the polymerization in the presence of solvents in order to insure the production of high and more uniform yields of the particular type of vulcanizable plastic polymer most desired. A further object is to decrease the operating costs and losses attending polymerization by operating at elevated temperatures and thus accelerating the reaction without at the same time impairing the properties of the product.

With these objects in view, it has been found that the polymerization may be satisfactory controlled at temperatures above 45° C. provided the concentration of the polymer is maintained below the point where gelation of the polymerizing mass occurs during the time that the temperature of the polymerizing mass is above 45° C. The addition of inert solvents is a convenient method of accomplishing this end. Particularly good results are obtained if the polymerization is initially effected in the absence of a solvent at a temperature below about 45° C. and then further polymerized at higher temperatures in the presence of an amount of solvent sufficient to maintain the concentration of the polymer below the point of gelation. The initial polymerization in the absence of a solvent is preferably carried to a stage just short of gelation.

The amount of solvent to be employed may be varied within wide limits but is preferably minimized and added from time to time as the polymerization progresses in such quantities as are necessary to prevent gelation of the mass. In general it may be said that, during the latter stage of the polymerization, where the temperature is in excess of 45° C., the concentration of the polymer should be maintained below about 18%, preferably between 15 and 18%, to avoid gelation.

The following example will serve as an illustration of the process.

Example

One hundred pounds of 2-chloro-1:3-butadiene that has been freshly distilled and washed with caustic soda solution are charged into a jacketed, agate lined autoclave equipped with an agitator and condenser. The chlor hydrocarbon is allowed to polymerize by itself with agitation for 24 hours, keeping the temperature between 35–40° C. Now 77 pounds of carbon tetrachloride with 1 pound of distilled water (accelerator) are added to the partially polymerized 2-chlor-1:3-butadiene and the temperature of the mixture in the autoclave raised to 60° C. When 15–18% polymer (based on the total volume and judged by viscosity and analysis) has formed a second 77 pound lot of carbon tetrachloride is added. The concentration of carbon tetrachloride is thus increased stepwise as polymerization progresses keeping the amount of polymer present between 15-18% for each addition until 463 pounds of carbon tetrachloride (or 3 vols. for 1 vol. of 2-chlor-1:3-butadiene) have been added. In 30 to 40 hours at 60° C., 60% of the original 2-chlor-1:3-butadiene is polymerized. The viscous carbon tetrachloride 2-chlor-1:3-butadiene-polymer mixture is then treated with ethyl alcohol to precipitate the plastic polymer and to wash out residual carbon tetrachloride, 2-chlor-1:3-butadiene, and traces of objectionable impurities.

It will be understood that the above example is merely illustrative and that the conditions of operation may be varied within wide limits. The polymerization may of course be discontinued at any point desired.

Thus, any one of a large number of inert volatile solvents other than carbon tetrachloride may be employed. Among such solvents may be mentioned, benzene, dichlor ethylene, per chlor ethylene, chloroform, dipentene and the like, but carbon tetrachloride is preferred. For some unknown reason benzene has a retarding action as compared with carbon tetrachloride and the polymerization proceeds more slowly when benzene is used as a solvent. The higher boiling solvents, such as perchlor ethylene and dipentene, while they may be employed, are less desirable due to the fact that the last traces of these solvents are slowly eliminated by volatilization during the milling or air-drying of the final product.

Obviously the solvent may be added in any suitable manner. Thus, instead of adding the solvent in stages as disclosed in the example, it may obviously be added continuously in a slow stream, adjusted to maintain a concentration of 15-18% polymer throughout the polymerization. When operating in this manner it is preferable to add the first solvent as a batch and thereafter maintain the desired concentration by the continuous method.

The rate of polymerization, of course, is greatly affected, as already disclosed in previous applications, by light, pressure and catalysts as well as temperature and the present invention may be carried out under any of the conditions described as acceptable in the previously filed Carothers and Collins applications so long as such conditions are compatible with the essential features of the present invention.

Polymerization catalysts such as the peroxides may be used as desired. Also, polymerization inhibitors or anti-oxidants may or may not be present during the polymerization of the solution. Among the preferred inhibitors and antioxidants may be mentioned catechol, pyrogallol, trinitrobenzene, metatoluylene diamine, phenylene alpha naphthylamine, and thiodiphenylamine. Although the presence of such inhibitors greatly increases the time required for polymerization, their use is often desirable for the purpose of facilitating the control of the polymerization to obtain polymer products having particular characteristics. Such inhibitors may of course be added subsequent to or at any stage of the polymerization for the purpose of preserving the product.

The usual compounding ingredients and inert fillers commonly employed in the rubber art also may be incorporated either prior to, during or subsequent to polymerization.

A number of advantages result when the improved process of polymerization described above is followed. In the first place, much higher yields of good quality workable plastic polymer (up to 80% and above) may be obtained. The production of higher yields of material is attended by a corresponding reduction in the costs of operation and likewise by a reduction in the amount of material lost.

In the second place, by this method, polymerization may be carried out at elevated temperatures without impairing the quality of the material, thus accelerating the reaction and decreasing the operating cycle.

Thirdly, the plastic polymer obtained by initially polymerizing at low temperatures and subsequently at higher temperatures with a solvent remains soft and flexible on aging and the finished cured elastic rubber retains its softness and flexibility over an indefinite period when cooled to −10° C. As will be evident, this property of remaining soft on milling is of great value in the cured polymer and heretofore it has been necessary to resort to difficultly controlled and expensive processes to gain this advantage. The plastic polymer made at room temperature is likely to become hard and stiff on standing and therefore less easy to handle until plasticized by milling whereas if the freshly distilled chloro-2-butadiene-1,3 is immediately heated to a temperature above about 45° C. with a solvent, plastic polymers are obtained which have 25-30% lower tensiles when cured than those characterizing materials prepared from chloro-2-butadiene-1,3 by polymerizing at room temperature. In short, the product of the improved process is found to have tensiles equal to those of polymers formed at room temperature but is less inclined to become hard and stiff on standing and is more easy to handle.

As many apparent and widely different embodiments of this invention may be made without departing from the spirit thereof, it is to be understood that we do not limit ourselves to the foregoing examples or description except as indicated in the following claims.

We claim:

1. A process for the preparation of a polymer of chloro-2-butadiene-1,3, which comprises polymerizing chloro-2-butadiene-1,3 to a stage short of gelation at a temperature below substantially 45° C. and further polymerizing at a higher temperature.

2. A process for the preparation of a polymer of chloro-2-butadiene-1,3, which comprises polymerizing chloro-2-butadiene-1,3 to a stage short of gelation at a temperature below substantially 45° C. and further polymerizing at a higher temperature in the presence of an inert solvent.

3. The process of claim 2 wherein the initial polymerization is carried out in the absence of a solvent.

4. In a process for controlling the preparation of a polymer of chloro-2-butadiene-1,3 which comprises heating the chloro-2-butadiene-1,3 to a temperature above 45° C., the step of maintaining the concentration of the polymer, while heated above 45° C., at about 15-18% (by volume) by the addition of an inert solvent.

5. The process of claim 1 wherein the further polymerization is carried out in the presence of an inert solvent and at a temperature between substantially 45° and 70° C.

6. A process for the preparation of a polymer of chloro-2-butadiene-1,3 which comprises initially polymerizing not over 18% (by volume) of the chloro-2-butadiene-1,3 at a temperature not over about 45° C. and in the absence of a solvent, adding a solvent and further polymerizing at a temperature above about 45° C.

7. The process of claim 6 wherein such a quantity of solvent is added as to maintain the concentration of polymer at not over substantially 18% (by volume) during the time the temperature exceeds 45° C.

8. The process of claim 6 wherein the quantity of added solvent is increased during the course of further polymerization at such a rate as to prevent the formation of a jelly-like mass.

9. The process of claim 6 wherein the quantity of added solvent is continuously increased during the course of further polymerization at such a rate as to prevent the formation of a jelly-like mass.

10. The process of claim 6 wherein the temperature during the step of further polymerization does not exceed 70° C.

11. The process of polymerizing chloro-2-butadiene-1,3 which comprises maintaining 100 parts (by weight) of said substance at a temperature of about 35 to 40° C. for about 24 hours, adding 77 parts (by weight) of carbon tetrachloride to the partially polymerized product and thereafter effecting further polymerization by maintaining the temperature at between 45° and 100° C. while introducing carbon tetrachloride in such amount as to maintain the concentration of the polymer between 15 and 18% by volume.

IRA WILLIAMS.
HERBERT W. WALKER.